United States Patent [19]
Harris et al.

[11] Patent Number: 5,599,562
[45] Date of Patent: Feb. 4, 1997

[54] UNDERWATER PELLETIZER

[75] Inventors: Ronald D. Harris, Houston; Robert B. Wood, Belleville, both of Tex.

[73] Assignee: Shell Oil Company, Houston, Tex.

[21] Appl. No.: 431,242

[22] Filed: Apr. 28, 1995

[51] Int. Cl.⁶ .................................................. B29B 9/00
[52] U.S. Cl. .................. 425/67; 264/142; 425/311; 425/313; 425/DIG. 230
[58] Field of Search .................................. 264/140, 142, 264/141, 143, 144; 425/67, 308, 310, 311, 313, 316, DIG. 230, 196, 184

[56]          References Cited

U.S. PATENT DOCUMENTS

| | | | |
|---|---|---|---|
| 3,029,466 | 4/1962 | Guill | 425/313 |
| 3,196,487 | 7/1965 | Snelling | 425/67 |
| 3,317,957 | 5/1967 | Heston et al. | 425/67 |
| 3,808,962 | 5/1974 | Liepa | 425/313 |
| 4,099,900 | 7/1978 | Bradbury et al. | 425/313 |
| 4,251,198 | 2/1981 | Altenburg | 425/313 |
| 4,621,996 | 11/1986 | Hundley, III . | |
| 4,874,307 | 10/1989 | Comper et al. | 425/313 |
| 5,146,831 | 9/1992 | Fetter, Jr. et al. | 425/DIG. 230 |
| 5,358,399 | 10/1994 | Ogoshi et al. | 425/311 |

*Primary Examiner*—Jay H. Woo
*Assistant Examiner*—Duane S. Smith
*Attorney, Agent, or Firm*—Grace Tsang

[57]          ABSTRACT

An improved underwater pelletizer adapted to prevent extruded material from agglomerating in an pelletizing assembly, which pelletizer includes a cutting assembly having (1) a shroud fixedly mounted on the outer periphery of the cutting assembly thereby preventing pellets from being trapped between the die face and the cutting assembly; and (2) novel knives contoured to conform in their angular positions to the curvature of the shroud.

17 Claims, 5 Drawing Sheets

FIG.1
(PRIOR ART)
FIG.2
(PRIOR ART)
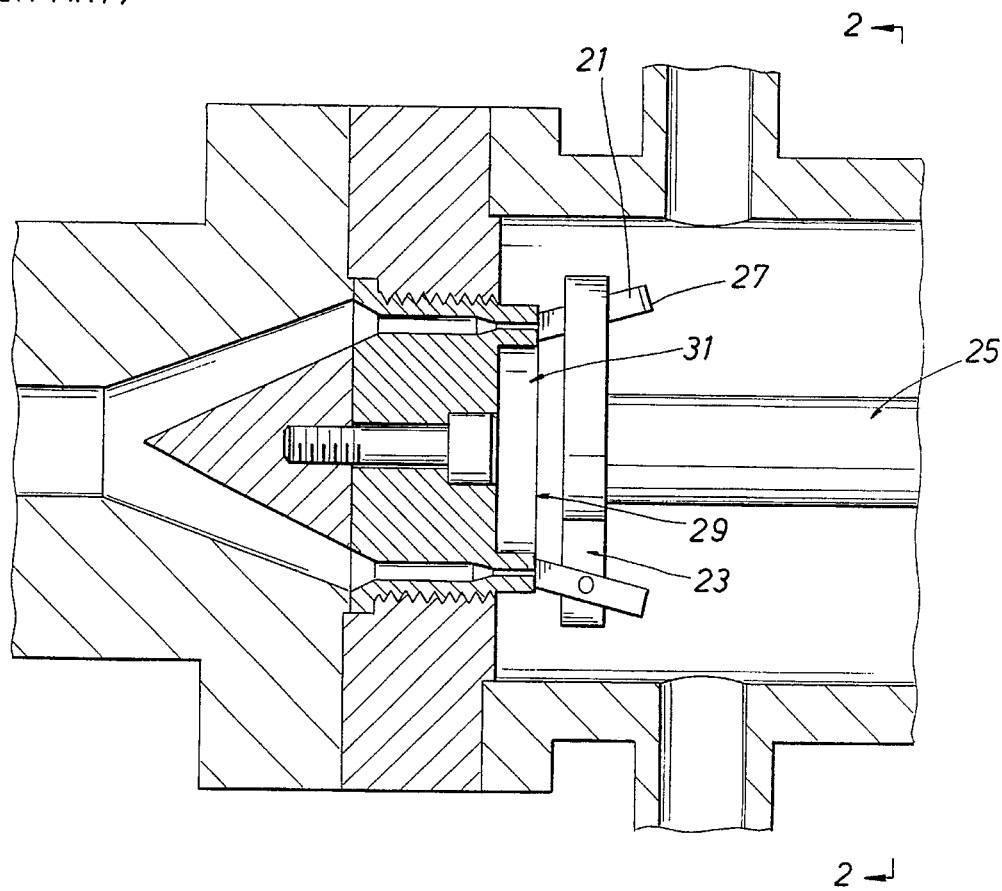
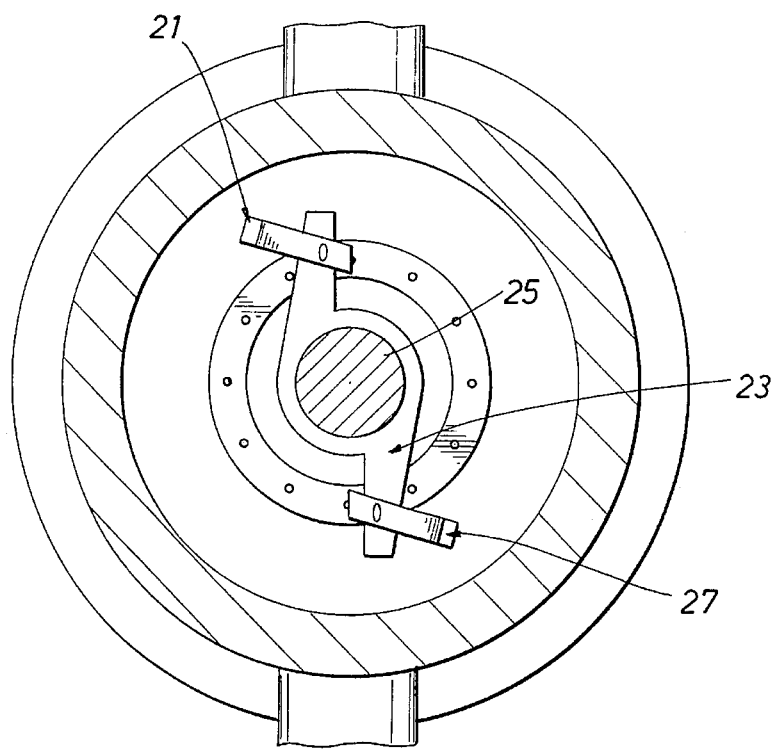

UNDERWATER PELLETIZER

FIELD OF THE INVENTION

This invention relates to underwater thermoplastic pelletizers and, in particular, to underwater pelletizers having improved means for cutting thermoplastic strands into pellets. This invention also relates to an improved method for preventing extruded material from agglomerating in an pelletizing assembly.

BACKGROUND OF THE INVENTION

The pelletization of extrudable materials is of considerable importance for many applications. Pellets, unlike ingots or bars, readily flow in measuring and dispensing apparatus and the size of pellet charges can be readily controlled to small tolerances. Moreover, unlike powders, they do not form dust and are not ingested by persons working with them. Thus, they provide a highly convenient form for the packaging, storage and use of many thermoplastic polymers, food products, etc.

Underwater pelletizers are known which employ a rotating disc cutter to cut or sever stranded polymer as it exits from the die plate of an extruder. The cutting is accomplished in a chamber full of circulating water which functions to cool the strand and also to carry away the cut pellets. The prior art disc cutters are of two types: (1) knives which extend radially from a central hub or (2) multiple blades which are attached to spoked hubs.

Attempts to use the prior art disc cutters to pelletize extrudable materials such as fluidic materials which require a relatively long time to solidify have resulted in agglomeration of extruded materials in the pelletizers. The extruded materials often are trapped in the area between the cutting hub and the die face and agglomerates into "trashouts". The extruded materials also agglomerate and wrap around the extended knife blades.

Pelletization of thermoplastic polymers, especially high melt flow thermoplastic polyolefins, have been particularly difficult using prior art underwater pelletizers. This problem is especially eminent in the production of ultra high melt flow and ultra low viscosity adhesive grade buteric-1-ethylene copolymers which contains from about 0.1 to 8 wt % of ethylene which are cracked by a free radical generator. The problem appears to relate to the slow crystallization rate of these polymers which exhibit extreme tackiness in pelletizing. It is known that as the pellets leave the cutting blades, they are very tacky and collide with other pellets to form agglomerates. With a longer residence time, the pellets change to an opaque color, as they complete their crystallization, become dense and lose their tackiness. Excessive turbulence around the trailing edges of the knives also contribute to the agglomeration problem. These agglomerates wrap around the cutting blades and create smears and chunks, plugging the pelletizer chamber, the spin dryer and the area between the die and hub. The extrusion line has to be shut down in order to clean the plugged section resulting in undesirable production interruptions. The agglomerations also result in an excess amount of non-uniform or real formed pellets which may be described by terms such as tailed pellets, long-string pellets, pellet marriages, elbows, dog bones, and pellet trash which are undesirable.

Referring to FIG. 1 and FIG. 2, U.S. Pat. No. 4,621,996, issued Nov. 11, 1986, and assigned to Gala Industries, proposes a conventional underwater plastic pelletizing machine which includes a number of flat cutting blades 21 mounted on a spoked hub 23 on a driven shaft 25 so that the extruded strand of plastic will be cut into a plurality of pellets. The cutting blades 21 proposed project outward, according to the drawing, from the spoked hub 23. There is a gap 29 between the spoked hub and the die face. This cutter design would not process a high melt flow, adhesive grade polymer properly because polymer smears in long strands and wraps around the cutting blades 21 and sharp edges on the hub 23. This is particularly true when the polymer processed has a relatively low viscosity, high tackiness and long crystallization time which make underwater pelletizing very difficult. It is known that excessive turbulence around the trailing edges of the knives also contributed to the wrapping problem.

It is also known that the extruded polymer pellets are entrapped in the gap 29 between the die face 31 and the hub creating smears and chunks, and thus plugging up the pelletizer. It is not practical to use this prior art pelletizer to pelletize adhesive grade ultra high melt flow polybutene-1-ethylene described above because of the frequency of shut downs required for cleaning up the plugged section.

As used herein, a high melt viscosity polymer is a polymer having a melt viscosity 1,000,000 cps or more; and an ultra low melt viscosity polymer is a polymer having a melt viscosity of about 300,000 cps or lower. A polymer with a melt viscosity of about 300,000 cps will have a melt index of approximately 100 dg/min, and is generally regarded as an ultra high melt flow rate polymer with an ultra high melt index. As used herein, the melt viscosity is measured by Brookfield Viscometer using ASTM D2556 at 350 degrees Fahrenheit (° F.), unless otherwise specified e.g. as measured at 275° F. As used herein, the melt flow rates or melt indices are measured by ASTM 1238 condition E at 190° C. and 2.16 kg wt.

OBJECT OF THE INVENTION

Therefore an object of this invention is the provision of a novel pelletizer which will prevent extruded material from agglomerating in a pelletizer.

Another object of this invention is the provision of a novel underwater pelletizer which produces thermoplastic polymer pellets, especially low viscosity and high melt flow polymer pellets, with high quality yet avoiding agglomeration in various agglomerate inviting sites such as the gap between the die face and the cutting hub, the sites where the cutting blades are mounted, around the cutting blades, the area between the inner surface of the cutting blades and the hub, etc.

Still another object of this invention is the provision of a novel method and process for preventing material from agglomerating in a pelletizing assembly.

The above and other objects are accomplished by novel features of the present invention which will become apparent from the following description, having reference to the annexed drawings.

SUMMARY OF THE INVENTION

In accordance with the present invention, the problems and disadvantages of the prior art pelletizer, as described above, are avoided or at least minimized by providing a pelletizing assembly for pelletizing an extruded material, said pelletizing assembly comprising:
an extrusion die plate comprising:
    a die face at downstream side of the die plate;

a die ring formed on the downstream side of the die face having a wear surface projecting outwardly from the die surface to form a recess in the center of the die ring, and said recess having a bottom surface facing the inner surface of said hub; and a plurality of channels extending from upstream side of the die plate and the die ring to the die face adapted to deliver the extruded material from the upstream side of the die plate to the die face for extrusion, and said channels forming orifices in the die ring for extruded material to exit the die plate;

a rotatable multi-bladed cutting assembly adjacent the die face, said cutting assembly comprising:

a circular hub attachable to a shaft having a center axis of rotation and rotatable coaxially in spaced relation to the die face, said hub having an inner surface facing the die face, an outer surface adjacent the shaft, and an outer periphery, a plurality of cutting blades affixed to the hub for rotation therewith, said cutting blades having cutting edges for movement adjacent the wear surface of the die ring, said cutting blades engage the surface of the die ring at an angle selected from about 10° to about 60°, said cutting blades having cutting edges parallel to plane of rotation of the hub, the width of the cutting edges of the cutting blades being substantially equal to that of said die ring; and a shroud either in the shape of a skirt or a cup fixedly mounted to the outer periphery of the hub, said shroud having slots to permit the insertion of the cutting blades which are affixed to an inner surface of the hub facing the die, said shroud having an outer diameter substantially equal to an inner diameter of said die ring thereby allowing said cutting edges of the cutting blades moving adjacent the downstream surface of the die ring, an interface being established between the shroud and the surface of the die ring which permits free rotation of the cutting assembly and forms a barrier to prevent pellet migration between the hub and the bottom surface of said recess on the die face, optionally a portion of the shroud at the side facing the die protruding into the recess formed by the die ring and being wearable against the bottom surface of the recess as the cutting assembly is advanced toward the die to compensate the wearing of the cutting blades, optionally a spring being secured between the inner surface of the hub facing the die and inner bottom side of the cup-shaped shroud to permit the advancement of the hub along with the affixed cutting element toward the die to compensate for wearing of the cutting element;

wherein said cutting blades having inner surfaces contoured to conform in their angular positions to curvature of the outer periphery of the shroud and are in continuous contact with the outer periphery of said shroud thereby substantially eliminating gap between inner surfaces of cutting blades and the outer periphery of the shroud;

wherein said cutting element has an outside edge contoured in the same curvature as the inner edge so that the width of the cutting edge remains constant as the cutting element wears.

The invention also provides a process and a method for preventing material from agglomerating in a pelletizing assembly using the pelletizer described above.

The foregoing and other aspects, features and advantages of the present invention will be apparent from the specification which follows.

BRIEF DESCRIPTION OF THE DRAWINGS

FIG. 1 is a vertical sectional view of the prior art underwater pelletizer, disclosed in U.S. Pat. No. 4,621,996, with flat cutting blades mounted on a spoked hub secured on a driven shaft. There is a gap between the spoked hub and the die face.

FIG. 2 is a front view on the line 2—2 of FIG. 1 of the prior art underwater pelletizer disclosed in U.S. Pat. No. 4,621,996.

DESCRIPTION OF THE EMBODIMENTS

The present invention in its broadest scope relates to a pelletizing assembly having a first surface on the cutting assembly corresponding to a second surface on the extrusion die plate such that an interface is established between the cutting assembly and the extrusion die which permits free rotation of the cutting assembly and forms a barrier to prevent pellet migration between the die face and the hub and/or agglomerate inviting sites. The first surface can be a barrier element. In the alternative, the second surface can be a barrier element.

Referring to FIGS. 3–12, the present invention further relates to the use of a shroud 33, fixedly mounted on the circular hub to prevent agglomeration in various agglomerate inviting sites in the pelletizer such as the gap between the die face and the cutting hub, the sites where the cutting blades are mounted, areas around the cutting blades, the area between the inner surface of the cutting blades and the hub, etc.

The present invention will be described and illustrated by the following embodiments, which are provided for illustration purpose only and not intended to limit the scope of the instant invention.

Reference is first made to FIGS. 3–10 which illustrate an improved underwater pelletizer according to the first embodiment of the present invention.

Figure 3:
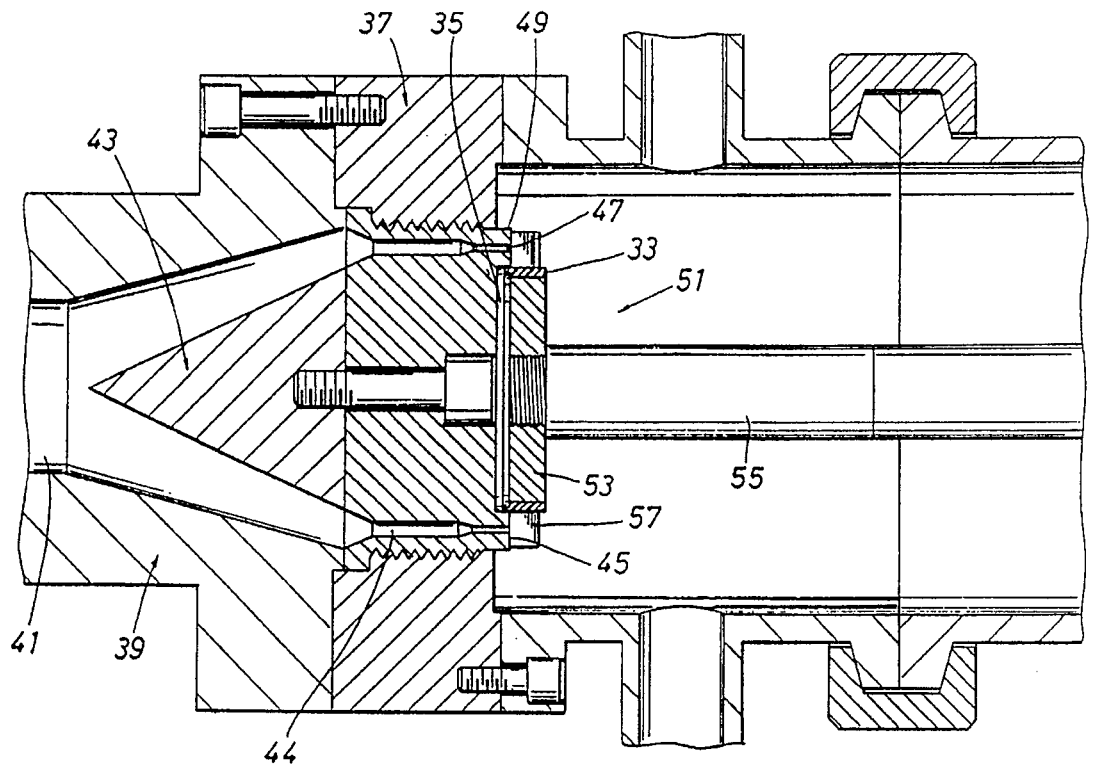
FIG. 3 is a vertical sectional view of a pelletizer of the first specific embodiment of the present invention having a shroud of an annular ring fitted to the outer periphery of the cutting hub. The outer periphery of the shroud is held to a close clearance to the inner diameter of the raised die ring to effect a barrier against pellet migration. The cutting blades are contoured to conform to the outer periphery of the shroud eliminating any gaps between the cutting blades and the outer periphery of the cutting hub.
Figure 4:
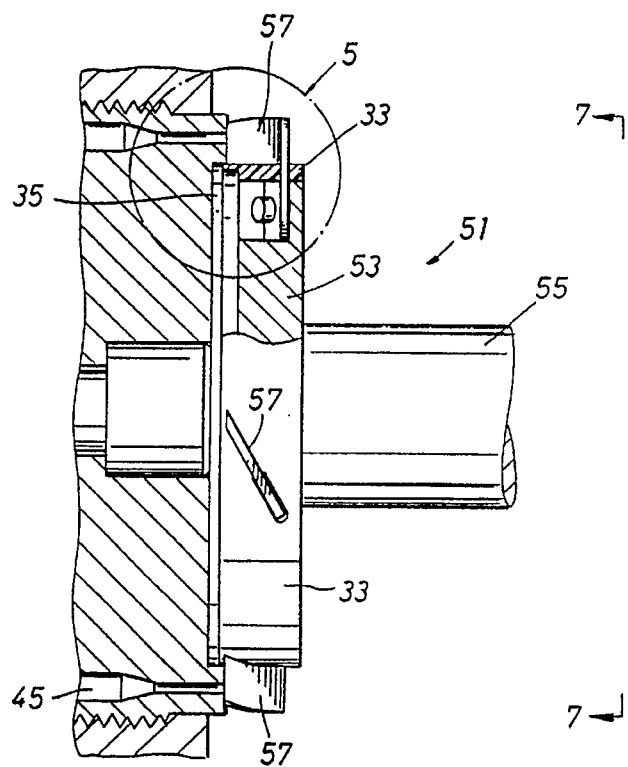
FIG. 4 is a partially sectional view of the arrangement of the shroud, cutting hub, die ring and cutting blades according to a first specific embodiment of the present invention.

Referring to FIG. 3, the pelletizer comprises, in substance, a die plate 37 having a plurality of circumferentially spaced and radially disposed bores or recesses which receive electrically operated heating cartridges for heating die plate in a well known manner. The die plate can also be steam heated via channels formed in the die. The die plate 37 includes an inlet passageway 41 for extrudable material such as thermoplastic polymer which is diverted by a nose cone 43 through a plurality of channels 44 so that the extrudable material is extruded in a continuous ribbon or strand from the orifices 47 of the die face 45 which is the downstream side of the die plate. The die face 45 is provided with a wearable surface forming a circular die ring 49 projecting outwardly from the die face toward the hub, i.e. elevated or raised from the die face. Since the wearable surface on the die ring is elevated or projecting outwardly from the die face, it forms a recess or a bowl shaped cavity 35 which invites agglomeration of the pellets. The die ring 49 has a width which is substantially equal to that of the cutting edge of the cutting blades 57 thereby establishing an even wear of the cutting edge of the cutting blades and the die ring, as cutting blades 57 are wearing against the die ring 49 during the pelletizing operation. When the cutting edge of the cutting blades 57 are wider than the die ring, the cutting edge of the blades would not wear evenly. This can lead to a "crowning" of the inside and/or outside edges of the die and possible damage to the die plate body as the knives wear into softer material. When the cutting edge of the cutting blades are narrower than the die ring, there would be groove formation on the die ring over which a new cutting blade 57 may not track properly on the die ring.

Figure 7:
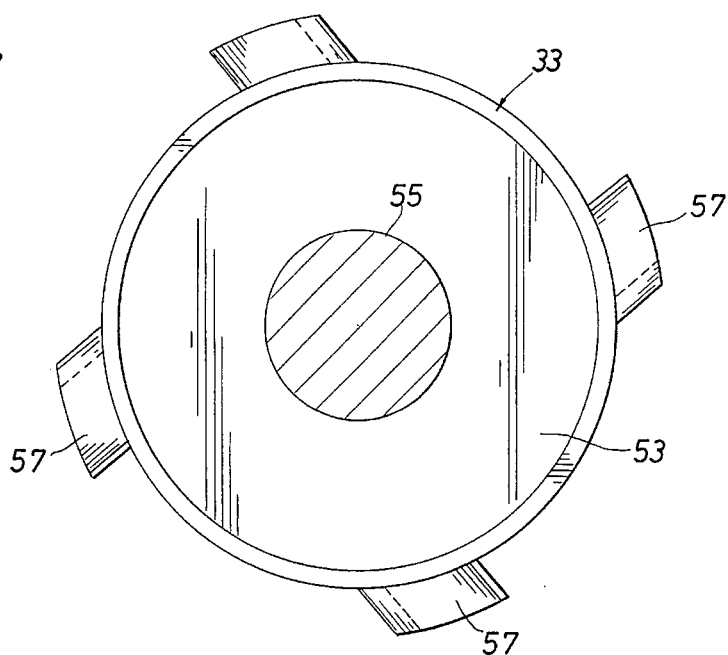
FIG. 7 is a front view on the line 9—9 of FIG. 4, viewing from the side furthest from the die according to the first specific embodiment of the present invention.
Figure 8:
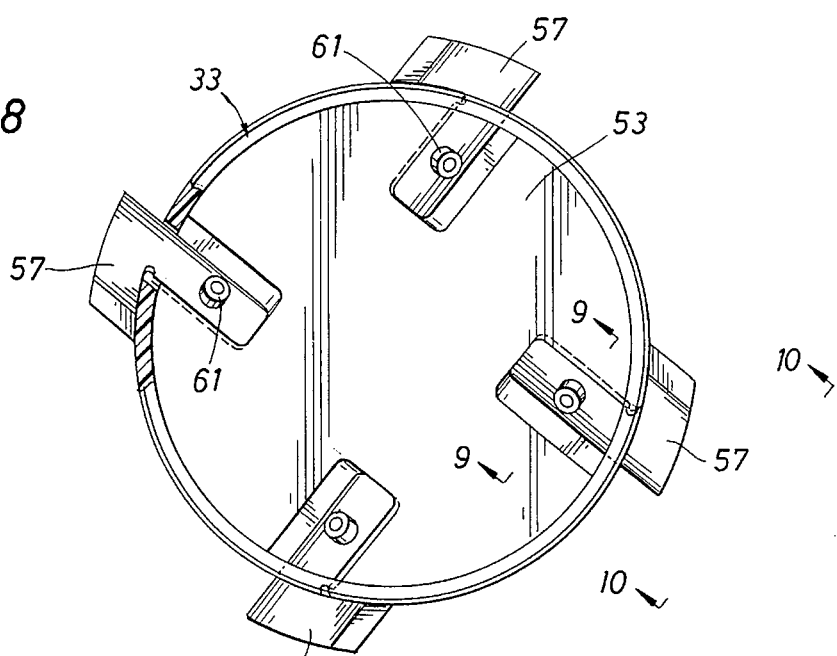
FIG. 8 is a rear view of the cutting hub of FIG. 7 viewing from the side closest to the die.

Associated with the wearable surface formed on the die ring 49, is a multi-bladed rotatable cutting assembly 51. Referring to FIGS. 7 and 8, the cutting assembly 51 includes cutting blade(s) 57 mounted on a circular hub 53 for rotation. The hub is attachable to a shaft 55 (see FIGS. 3–4) having a center axis of rotation and rotatable coaxially to the die face 45, so that the extruded ribbon or strand of material will be cut into a plurality of pellets. The sizes and dimensions of all the parts depend upon the size of the pelletizers. The number of cutting blades mounted on the cutting assembly also varies with the type and size of the pelletizer, non-limiting range of the number of blades is from 1 to about 500.

Figure 9:
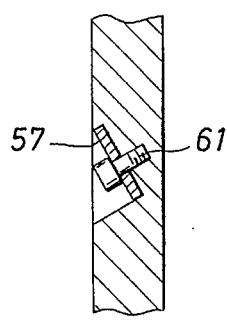
FIG. 9 is a flagmental section on the line 9—9 of FIG. 8 illustrating the mounting of the cutting blade to the cutting hub of FIG. 8.
Figure 10:
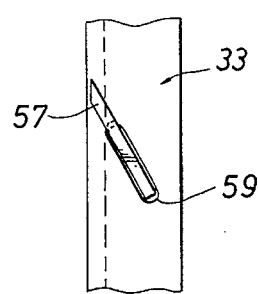
FIG. 10 is a fragmental side-view on the line 10—10 of FIG. 8 of the cutting assembly of FIG. 8 showing the shroud extending slightly beyond the cutting plane of the cutting blade, and the bottom portion of the annular ring being thinner than the upper portion.

As a specific aspect of the first embodiment of the present invention, a protective ring element of shroud element 33 such as skirt-like annular ring or liner is snugly fitted to the outer periphery of the hub 53. The shroud 33 has a slot 59 to permit the insertion of the cutting blades which are mounted on the hub 53 by any suitable means such as a bolt or screw 61 as shown in FIG. 9.

Figure 5:
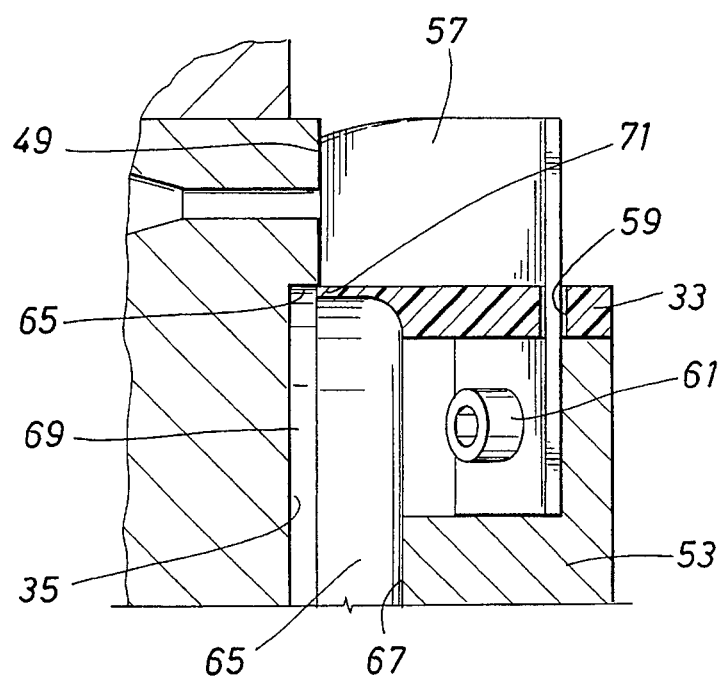
FIG. 5 is a fragmental section on the line 5—5 of FIG. 4, on an enlarged scale, showing the interface of the shroud, cutting hub, die ring and cutting blades when a cutting blade is relatively new. The edge of the shroud is not in contact with the bottom surface of the recess of the die face.
Figure 6:
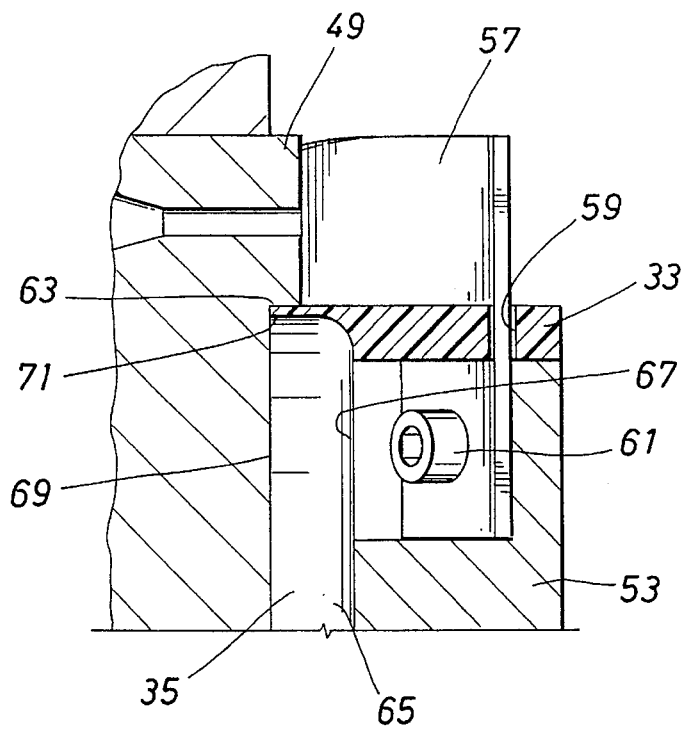
FIG. 6 is a fragmental section on the line 5—5 of FIG. 4, on an enlarged scale, when a cutting blade has been worn and the cutting has been advanced. The edge of the shroud is wearing against the bottom of the recess of the die face.

Referring to FIG. 5 and 6, the outer diameter of the shroud 33 is substantially equal to the inner diameter of the die ring 49 thereby allowing the cutting edges of the cutting blades 57 to be in close contact with the wear surface of the die ring 49. In pelletizing operations, the cutting blades rotate with the hub following the die ring as the track. Preferably, a minimal clearance exist between the shroud and the die ring to permit free rotation. The outer periphery of the shroud is held to a close tolerance to the inner diameter of the die ring to effect a barrier against pellet migration.

As non-limiting illustrative example, the outer diameter of the shroud is slightly smaller, e.g. from about 0.01 mm to about 0.25 mm smaller, than the inner diameter of the die ring to allow a portion of the skin 63 adjacent to the die ring to be inserted or protruded in to the bowl-like recess or cavity in the center of the die ring. In a non-limiting example of the hub design of the first specific embodiment of the present invention, the inner surface of the hub 67 is downstream from the cutting plane of the cutting blade and thereby forming a gap 65 between the inner surface of the hub 67 and cutting plane or downstream surface of the die ring. The shroud substantially covers the bowl-shaped recess or cavity 35 thereby preventing the pellets from entering the recess or cavity 35 and the space 65 under the hub.

In a prior art pelletizer, without the shroud, the pellets, especially high melt flow thermoplastic polymers having slow crystallization rate, tend to agglomerate within the gap or chamber between the inner surface of the hub 67 and the bottom surface 69 of the recess. The present shroud 33 forms a seal or barrier thereby effectively prevents the pellets from entering the gap between the inner surface of the hub 67 and the bottom 69 surface of the recess thereby substantially prevents pellet recirculation under the hub, thus eliminating agglomeration of the pellets in the gap and the inner surface 67 of the hub. The cutting blades are bolted on the inner side of the hub, thus there are no notches, slots or screw head for the polymer to hang on. Since the shroud also prevents pellets from entering the inner surface 67 of the hub, the shroud 33 thus prevents pellet agglomeration at the screw 61 and the area adjacent to the screw which would otherwise invite trapping and agglomeration of the polymer.

As a specific embodiment of the first embodiment of the present invention, a portion of the shroud 71 at the upstream side facing the die protrudes into the recess formed by the die ring and being wearable against the bottom surface 69 of the recess when the cutting blades along with the hub are advanced toward the die to compensate for the reduction in the length of the blade caused by the wearing of the cutting blades. FIG. 5 shows an edge 71 of the shroud not in contact with bottom surface of the recess 69 of the die face when the cutting blades are relatively new. FIG. 6 illustrates the wearing of the edge of the shroud 71 against the bottom of the recess 69, when a cutting blade has been worn and the cutting hab has been advanced.

As another specific embodiment of the first embodiment of the present invention, a portion of the shroud 71 at the upstream side facing the die is thinner than the remaining portion of the shroud thereby reducing the amount of scrap material generated from the wear of the shroud.

The shroud is made of any suitable material. Where the shroud is wearable, it is preferred that the shroud is made of a material compatible with the material for making the pellets. Non-limiting examples of such materials include polyethylene, polypropylene, Teflon (tetrafluoroethylene fluorocarbon polymers or fluorinated ethylene-propylene resins), nylon, (polyamide), phenolic resin, polyacrylic polymer, polyester, polycarbonate, etc.

The cutting blades 57 are mounted to the hub, preferably to the inner surface of the hub and rotate during a pelletizing operation in close contact with the downstream surface of the die ring 49. Since the pellets are prevented from contacting the inner surface by the shroud, mounting the cutting blades to inner surface 67 effectively prevents the agglomeration of the pellets around the bolts and screws 61.

The cutting blades 57 engage the surface of the die ring at an angle selected from about 10° to about 60°, preferably from about 20° to about 40°, and still more preferably from about 30° to about 36°. A low incident angle not only enables a clean cut, instead of smearing, of the extrudate but also minimizes turbulence in the surrounding cooling water. Turbulence in the cooling water is undesirable because it results in sharp changes in flow directions which tends to both distort still molten pellets and can lead to pellet recirculation and agglomeration in stagnant areas. The low incidence angle used in the present cutting assembly also reduces or eliminates the cavitation zone that forms in the zone behind the cutting blades. Other prior art blunt designs with higher incidence angles may lead to the formation of a vapor pocket on the trailing edge of the knives. This vapor pocket rotates with the blades and acts as an insulating medium between the surrounding cooling water and the face of the die ring. As a consequence the die face runs hotter than if cooling waster was in contact with the die, thereby increasing the likelihood of smearing of the extruded material and producing non-discrete pellets.

The cutting blades of the present invention have cutting edges parallel to plane of rotation of the hub. The width of the cutting edge of the cutting blade is substantially equal to that of the die ring, and the cutting blades have inner edges contoured to conform in its angular position to curvature of the outer periphery of the shroud and are in continuous contact with the outer periphery of said shroud thereby substantially eliminating gap between inner surface of cutting blade and the outer periphery of the shroud. The outside edges of the cutting blades are contoured in the same curvature as the inner edges so that the width of the cutting edges remain constant as the cutting blades wear.

Figure 11:
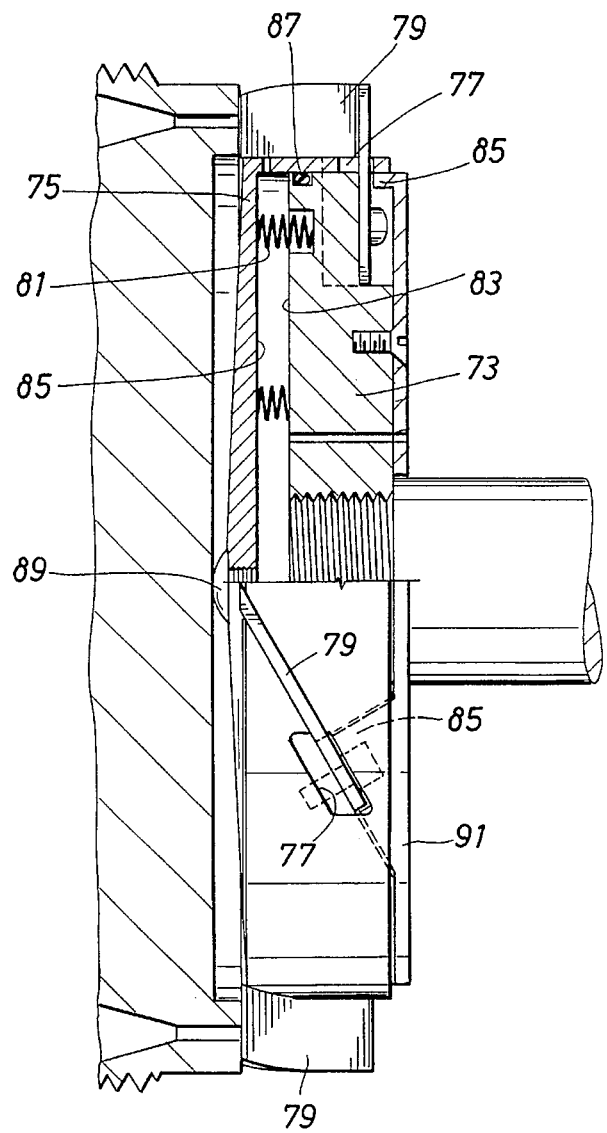
FIG. 11 is a flagmental sectional view, of the cutting assembly according to a second specific embodiment of the present invention having a cup shaped shroud which does not change position as the cutting blades are worn and advanced. Cutting blades are bolted to the outer surface of the cutting hub and a backcover is bolted to the outer side of the cutting hub to prevent pellet agglomeration at the outer side of the cutting hub. The backcover has a skin to close the gap in the slot for insertion of the blade, said gap is formed from hub and blade advancement as cutting blades are worn.
Figure 12:
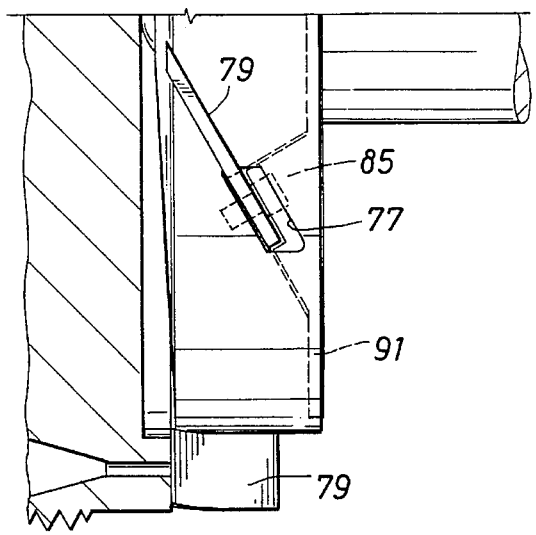
FIG. 12 is a fragmental sectional view of the cutting assembly of FIG. 11 showing the cutting hub advanced toward the die face as the cutting blades are worn and advanced while the shroud remains at the same position.

Reference is now made to FIGS. 11–12 which show another form of pelletizer according to the second embodiment of the present invention.

As there shown, the cutting assembly comprises a backplate or hub 73 of circular configuration having a cup-shaped shroud 75 fixedly mounted on the outer periphery and inner surface of the cutting hub. The cup-shaped shroud has a slot 77 at the outer periphery of said shroud to permit the insertion of the cutting blades 79. Spring(s) 81 are secured between the inner surface of the hub 83 facing the die and inner bottom side 85 of the cup-shaped shroud to keep the cup-shaped shroud in the desired position relative to the die plate when the hub along with the knives are advanced toward the die to compensate for wearing of the knives 79.

Similar to the shroud described in the first embodiment of the present invention, the cup-shaped shroud element has an outer diameter substantially equal to the inner diameter of said die ring thereby allowing said cutting edge of the cutting element moving adjacent the downstream surface of the die ring, and an interface is established between the shroud and the surface of the die ring which permits free rotation of the cutting assembly and forms a barrier to prevent pellet migration between bottom surface of the cup-shaped shroud and the bottom surface of said recess on the die face.

The cutting blades are secured to the outer surface of the hub, and said slot on the outer periphery of the shroud for insertion of the cutting element has a size and a shape with sufficient clearance adapted to allow advancement of the hub and the cutting element affixed thereto to compensate for the wear of the cutting edge of the cutting blades. The shroud touches the bottom surface of the recess on the die face via a hard button 89 to minimize wear and friction.

There is a backcover 91 secured to the hub having the outer diameter substantially equal to the outer diameter of the hub to prevent thermoplastic material from agglomerating at the outer surface of the hub and at the sites where the cutting blades are affixed to the hub.

As a specific aspect of the second embodiment, the backcover has an axial extension 85 adapted to cover the a hole in the slot located on the outer periphery of the shroud formed from the advancement of the hub, thereby reducing the areas where pellets can agglomerate. In this embodiment, as the cutting blades or knives wear from close contact with the die ring, the hub and the cutting blades are advanced toward the die with the springs(s) 81 being pressed to a shorted length. As shown in FIG. 12, the relative position of the shroud to the die remains unchanged as the hub is advanced. An O-ring 87 located between the inside of the cup-shaped shroud and the outer periphery of the hub serves to provide sufficient friction to cause the shroud 75 to rotate with the hub 73 driven by the shaft during pelletizing operation, as well as center of the shroud with respect to the hub.

Suitable material for the non-wearing type of shroud can also be made of the polymers described above or metal, such as stainless steel, aluminum, brass, bronze, etc.

As an illustrative example, in operation, hot thermoplastic material is continuously extruded through the orifices of the die ring in the form of hot thermoplastic rods or strands and are cut into short lengths or pellets by the knives operatively in contact with the die ring. The pelletizer is immersed in water. The pellets are quickly cooled by the water and carried in suspension from the housing to a collection station.

The third embodiment of the present invention relates to a process or a method for preventing material from agglomerating in an pelletizing assembly using the pelletizing assembly described above.

In an illustrative example, an ultra low melt viscosity thermoplastic polymer having a melt viscosity of 300,000 or lower measure by Brookfield Viscometer using ASTM D2556 at 350° F., and a melt index of about 100 dg/min or higher measured by ASTM 1238 condition E at 190° C. and 2.16 kg wt. is extruded using a pelletizer according to the first embodiment of the present invention. Specifically, a polymeric feedstock comprising an ultra low melt viscosity thermoplastic butene-1-ethylene copolymer consisting essentially of (i) from about 92 wt % to about 98 wt% of butene-1 and (ii) from about 2 wt% to about 8 wt% of ethylene is extruded using the pelletizer in the first embodiment of the present invention. The underwater pelletizer produced 50,000 lbs of ultra low viscosity polymer pellets without shut-down of the extrusion/pelletization line due to plug-up of the pelletizer. This compares favorably over the prior an pelletizer described in the Background of Invention.

In each of the foregoing embodiments, the number of blades of the rotary cutter member should by no means be limited to the illustrated examples and may be any other number which is more than one.

The ranges and limitations provided in the instant specification and claims are those which are believed to particularly point out a distinctly claim the instant invention. It is, however, understood that other ranges and limitations that perform substantially the same function in substantially the same manner to obtain the same or substantially the same result are intended to be within the scope of the instant invention as defined by the instant specification and claims.

We claim:

1. A pelletizing assembly for pelletizing an extruded material, said pelletizing assembly comprising: an extrusion die plate comprising:

a die face at a downstream side of the die plate;

a die ring formed on the downstream side of the die face, said die ring has a wear surface projecting outwardly from the die surface to form a recess in center of die ring, said recess having a bottom surface facing the inner surface of said hub, and a channel means extending from upstream side of the die plate to the die face adapted to deliver the extruded material from the upstream side of the die plate to the die face for extrusion, and said channel means forming an orifice in the die face for extruded material to exit the die plate;

a cutting assembly mounted for rotation adjacent the die face, said cutting assembly comprising:

a hub attachable to a driving shaft for rotation in spaced relation with the die face:

a cutting element mounted on the hub for rotation therewith, said cutting element having a cutting edge for movement adjacent the downstream surface of die plate: and a first surface on the cutting assembly corresponding to a second surface on the extrusion die plate such that an interface is established between the cutting assembly and the extrusion die which permits free rotation of the cutting assembly and forms a barrier to prevent pellet from migrating (i) into said recess in center of die ring and (ii) between the die face and the hub.

2. A pelletizing assembly for pelletizing an extruded material, said pelletizing assembly comprising:

an extrusion die plate comprising:

a die face at downstream side of the die plate;

a die ring formed on the downstream side of the die face; and a channel means extending from upstream side of the die plate and the die ring to the die face adapted to deliver the extruded material from the upstream side of the die plate to the die face for extrusion, and said channel means forming an orifice in the die ring for extruded material to exit the die plate;

a cutting assembly mounted for rotation adjacent the die face, said cutting assembly comprising:

a hub attachable to a driving shaft for rotation in spaced relation with the die face;

a cutting element mounted on the hub for rotation therewith, said cutting element having a cutting edge for movement adjacent a downstream surface of the dieting: and a shroud element having a surface corresponding to a surface on said extrusion die such that an interface is established between the cutting assembly and the extrusion die which permits free rotation of the cutting assembly and forms a barrier to prevent pellet migration between the die face and the hub.

3. The pelletizing assembly as described in claim 2, wherein: the hub is a circular plate having a center axis of rotation and rotatable coaxially to the face of the die, said hub having an inner surface facing the die face, an outer surface adjacent the shaft, and an outer periphery, said shroud element is fixedly mounted on outer periphery of the hub, and said shroud element having a slot to permit the insertion of the cutting element which is affixed to the inner surface of the hub facing the die, said die ring has a wear surface projecting outwardly from the die surface to form a recess in center of die ring, said recess having a bottom surface facing the inner surface of said hub, and said shroud element has an outer diameter substantially equal to the inner diameter of said die ring thereby allowing said cutting edge of the cutting element moving adjacent the downstream surface of the die ring, and an interface is established between the shroud element and the surface of the die ring which permits free rotation of the cutting assembly and forms a barrier to prevent pellet migration between inner surface of the hub and the bottom surface of said recess on the die face.

4. The pelletizing assembly as described in claim 3, wherein a portion of the shroud at the side facing the die protrudes into the recess formed by the die ring.

5. The pelletizing assembly as described in claim 4, wherein said portion of the shroud protruded into the recess is wearable against the bottom surface of the recess as the cutting assembly is advanced toward the die to compensate for the wearing of the cutting element.

6. The pelletizing assembly as described in claim 5, wherein a portion of the shroud element at the side facing the die is thinner in width than the remaining portion of the shroud thereby reducing the amount of scrap material generated from wearing of the shroud.

7. The pelletizing assembly as described in claim 3, wherein said shroud is made from a polymer.

8. The pelletizing assembly as described in claim 7, wherein said shroud element is made from a polymer selected from the group consisting of polyethylene, polypropylene, tetrafluoroethylene fluorocarbon polymers, fluorinated ethylene-propylene resins, polyamide, phenolic resin, polyacrylic polymer, polyester, or polycarbonate.

9. The pelletizing assembly as described in claim 2, wherein:

said cutting blade engages the surface of the die ring at an angle selected from about 10° to about 60°.

said cutting blade has a cutting edge parallel to plane of rotation of the hub, the width of the cutting edge of the cutting blade is substantially equal to that of said die ring, said cutting element is a cutting blade having an inner edge contoured to conform in its angular position to curvature of the outer periphery of the shroud and is in continuous contact with the outer periphery of said shroud thereby substantially eliminating gap between inner surface of cutting blade and the outer periphery of the shroud, and said cutting element has an outside edge contoured in the same curvature as the inner edge so that the width of the cutting edge remains constant as the cutting element wears.

10. An underwater pelletizing assembly for pelletizing thermoplastic material, said pelletizing assembly comprising:

an extrusion die plate comprising:
  a die face at downstream side of the die plate;
  a die ring formed on the downstream side of the die face having a wear surface projecting outwardly from the die surface to form a recess in center of die ring, and said recess having a bottom surface facing the inner surface of said hub; and
  a plurality of channels extending from upstream side of the die plate and the die ring to the die face adapted to deliver the extruded material from the upstream side of the die plate to the die face for extrusion, and said channels forming orifices in the die ring for extruded material to exit the die plate;
a rotatable multi-bladed cutting assembly adjacent the die face, said cutting assembly comprising:
circular hub attachable to a shaft having a center axis of rotation and rotatable coaxially in spaced relation to the die face, said hub having an inner surface facing the die face, an outer surface adjacent the shaft, and an outer periphery,
a plurality of cutting blades affixed to the hub for rotation therewith, said cutting blades having cutting edges for movement adjacent the wear surface of the die ring, said cutting blades engage the surface of the die ring at an angle selected from about 10° to about 60°, said cutting blades having cutting edges parallel to plane of rotation of the hub, the width of the cutting edges of the cutting blades being substantially equal to that of said dieting; and
a shroud fixedly mounted to the outer periphery of the hub, said shroud having slots to permit the insertion of the cutting blades which are affixed to an inner surface of the hub facing the die, said shroud having an outer diameter substantially equal to an inner diameter of said die ring thereby allowing said cutting edges of the cutting blades moving adjacent the downstream surface of the dieting, an interface being established between the shroud and the surface of the die ring which permits free rotation of the cutting assembly and forms a barrier to prevent pellet migration between inner surface of the hub and the bottom surface of said recess on the die face, a portion of the shroud at the side facing the die protruding into the recess formed by the die ring and being wearable against the bottom surface of the recess as the cutting assembly is advanced toward the die to compensate for the wearing of the cutting blades;
wherein said cutting blades having inner surfaces contoured to conform in their angular positions to curvature of the outer periphery of the shroud and are in continuous contact with the outer periphery of said shroud thereby substantially eliminating gap between inner surfaces of cutting blades and the outer periphery of the shroud;
wherein said cutting element has an outside edge contoured in a similar curvature as the inner edge so that the width of the cutting edge remains constant as the cutting element wears.

11. The underwater pelletizing assembly as described in claim 10, wherein said cutting blades engage the surface of the die ring at an angle selected from about 30° to about 36°.

12. The pelletizing assembly as described in claim 10, wherein said shroud is made from a polymer selected from the group consisting of polyethylene, polypropylene, tetrafluoroethylene fluorocarbon polymers, fluorinated ethylene-propylene resins, polyamide, phenolic resin, polyacrylic polymer, polyester, or polycarbonate.

13. The pelletizing assembly as claimed in claim 2, wherein:
said hub is a circular plate having a center axis of rotation and rotatable coaxially in spaced relationship to the face of the die: said hub having an inner surface facing the die face, an outer surface adjacent the shaft, and an outer periphery:
said shroud element is a cup-shaped shroud fixedly mounted on the outer periphery and inner surface of said cutting hub, said cup-shaped shroud having a slot at the outer periphery of said shroud to permit the insertion of the cutting element;
a spring is secured between the inner surface of the hub facing the die and inner bottom side of the cup-shaped shroud to maintain the desired position of the shroud relative to the die plate;
said die ring has wear surface projecting outwardly of the die surface to form a recess in center of the die ring, said recess having a bottom surface facing the inner surface of said hub; and
said shroud element has an outer diameter substantially equal to the inner diameter of said die ring thereby allowing said cutting edge of the cutting element moving adjacent the downstream surface of the die ring, and an interface is established between the shroud element and the surface of the die ring which permits free rotation of the cutting assembly and forms a barrier to prevent pellet migration between bottom surface of the cup-shaped shroud and the bottom surface of said recess on the die face.

14. The pelletizing assembly as claimed in claim 13, wherein said cutting element is secured to the outer surface of the hub, and said slot on the outer periphery of the shroud for insertion of the cutting element has a size and a shape adapted to allow advancement of the hub and the cutting element affixed thereto to compensate for the wear of the cut surface cutting element.

15. The pelletizing assembly as claimed in claim 13, wherein said cutting assembly further comprises a backcover secured to the hub, which backcover have an outer diameter substantially equal to the outer diameter of the hub adapted to prevent thermoplastic material from agglomerating at the outer surface of the hub and at the site where the cutting element is affixed to the hub, wherein said backcover has an extension adapted to cover a hole in the slot located on the outer periphery of said shroud hub.

16. An underwater pelletizing assembly for pelletizing thermoplastic material, said pelletizing assembly comprising:
an extrusion die plate comprising:
  a die face at downstream side of the die plate:
  a die ring formed on the downstream side of the die face having a wear surface projecting outwardly from the die surface to form a recess in center of die ring, and said recess having a bottom surface facing the inner surface of said hub: and
  a plurality of channels extending from upstream side of the die plate and the die ring to the die face adapted to deliver the extruded material from the upstream side of the die plate to the die face for extrusion, and said channels forming orifices in the die ring for extruded material to exit the die plate:
a rotatable multi-bladed cutting assembly adjacent the die face, said cutting assembly comprising:
  a circular hub attachable to a shaft having a center axis of rotation and rotatable coaxially in spaced relation to the die face, said hub having an inner surface facing the die face, an outer surface adjacent the shaft, and an outer periphery, a plurality of cutting blades affixed to the hub for rotation therewith, said cutting blades having cutting edges for movement adjacent the wear surface of the die ring, said cutting blades engage the surface of the die ring at an angle selected from about 10° to about 60°, said cutting blades having cutting edges parallel to plane of rotation of the hub, the width of the cutting edges of the cutting blades being substantially equal to that of said die ring: and a cup-shaped spring loaded shroud fixedly mounted on the outer periphery and inner surface of said cutting hub, said cup-shaped shroud having a slot at the outer periphery of said shroud to permit the insertion of the cutting blades which are affixed to on the outer surface of the hub, a spring being secured between the inner surface of the hub facing the die and inner bottom side of the cup-shaped shroud to maintain the desired location of the shroud relative to the die plate, said shroud having an outer substantially equal to an inner diameter of said die ring thereby allowing said cutting edges of the cutting blades moving adjacent the downstream surface of the die ring, and an interface being established between the shroud and the surface of the dieting which permits free rotation of the cutting assembly and forms a barrier to prevent pellet migration between bottom surface of the cup-shaped shroud and the bottom surface of said recess on the die face;

wherein said cutting blades having inner surfaces contoured to conform in their angular positions to curvature of the outer periphery of the shroud and are in continuous contact with the outer periphery of said shroud thereby substantially eliminating gap between inner surfaces of cutting blades and the outer periphery of the shroud; wherein said cutting element has an outside edge contoured in the same curvature as the inner edge so that the width of the cutting edge remains constant as the cutting element wears.

17. The underwater pelletizing assembly as described in claim 16, wherein said cutting blades engage the surface of the die ring at an angle selected from about 30° to about 36°.

* * * * *